US010401832B2

(12) United States Patent
Snyder et al.

(10) Patent No.: US 10,401,832 B2
(45) Date of Patent: *Sep. 3, 2019

(54) TERRESTRIAL AND SPACE-BASED MANUFACTURING SYSTEMS

(71) Applicant: MADE IN SPACE, INC., Moffett Field, CA (US)

(72) Inventors: Michael Snyder, Mountain View, CA (US); Jason Dunn, Mountain View, CA (US); Aaron Kemmer, Mountain View, CA (US); Michael Chen, Mountain View, CA (US)

(73) Assignee: MADE IN SPACE, INC., Moffett Field, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/089,767

(22) Filed: Apr. 4, 2016

(65) Prior Publication Data

US 2016/0243759 A1    Aug. 25, 2016

Related U.S. Application Data

(63) Continuation of application No. PCT/US2015/051219, filed on Sep. 21, 2015, and a
(Continued)

(51) Int. Cl.
*B29C 67/00* (2017.01)
*G05B 19/4099* (2006.01)
(Continued)

(52) U.S. Cl.
CPC ........ *G05B 19/4099* (2013.01); *B29C 64/106* (2017.08); *B29C 64/20* (2017.08);
(Continued)

(58) Field of Classification Search
CPC ............ B29C 67/0055; B29C 67/0096; B29C 67/0088; B29C 67/0085; B29C 70/68;
(Continued)

(56) References Cited

U.S. PATENT DOCUMENTS

| | | |
|---|---|---|
| 3,534,926 A | 10/1970 | Wuenscher |
| 3,583,467 A | 6/1971 | Bennett et al. |

(Continued)

FOREIGN PATENT DOCUMENTS

| | | |
|---|---|---|
| DE | 10335735 | 2/2005 |
| EP | 2727709 | 5/2017 |

(Continued)

OTHER PUBLICATIONS

International Search Report, dated Sep. 8, 2017.
(Continued)

*Primary Examiner* — Robert J Grun
(74) *Attorney, Agent, or Firm* — Terry M. Sanks, Esq.; Beusse Wolter Sanks & Maire, PLLC

(57) ABSTRACT

A system including an additive manufacturing device to perform at least one additive manufacturing process and to include a prefabricated component during the at least one additive manufacturing process to accelerate build completion of a produced object. Another system and a method are also disclosed.

23 Claims, 12 Drawing Sheets

Related U.S. Application Data continuation of application No. 14/860,029, filed on Sep. 21, 2015.

(60) Provisional application No. 62/053,210, filed on Sep. 21, 2014.

(51) Int. Cl.
| | |
|---|---|
| *B33Y 10/00* | (2015.01) |
| *B33Y 30/00* | (2015.01) |
| *B29C 70/68* | (2006.01) |
| *B33Y 40/00* | (2015.01) |
| *B29C 64/106* | (2017.01) |
| *B29C 64/20* | (2017.01) |
| *B29C 64/35* | (2017.01) |

(52) U.S. Cl.
CPC .............. *B29C 64/35* (2017.08); *B29C 70/68* (2013.01); *B33Y 10/00* (2014.12); *B33Y 30/00* (2014.12); *B33Y 40/00* (2014.12); *G05B 2219/35134* (2013.01); *G05B 2219/49007* (2013.01); *Y02P 90/265* (2015.11)

(58) Field of Classification Search
CPC ......... B33Y 40/00; B33Y 30/00; B33Y 10/00; B33Y 50/02; G05B 19/4099; G05B 2219/49007; G05B 2219/35134; Y02P 90/265

See application file for complete search history.

(56) References Cited

U.S. PATENT DOCUMENTS

| | | | |
|---|---|---|---|
| 4,093,019 A | 6/1978 | Seybold et al. | |
| 4,439,979 A | 4/1984 | Winkelmann | |
| 4,614,630 A | 9/1986 | Pluim, Jr. | |
| 4,729,780 A | 3/1988 | Shimizu | |
| 4,753,730 A | 6/1988 | Maurer | |
| 5,259,436 A | 11/1993 | Yun et al. | |
| 5,303,141 A | 4/1994 | Batchelder et al. | |
| 5,541,802 A | 7/1996 | Bodahl-Johnsen | |
| 5,562,150 A | 10/1996 | Shimmell | |
| 5,775,402 A | 7/1998 | Sachs et al. | |
| 5,920,483 A | 7/1999 | Greenwood et al. | |
| 6,004,124 A | 12/1999 | Swanson et al. | |
| 6,135,880 A | 10/2000 | Ho et al. | |
| 6,143,378 A * | 11/2000 | Harwell .................. | C23C 26/02 427/264 |
| 6,367,765 B1 | 4/2002 | Wieder | |
| 6,431,975 B1 | 8/2002 | Ryan | |
| 6,575,548 B1 | 6/2003 | Corrigan et al. | |
| 6,758,876 B2 | 7/2004 | Suzuki et al. | |
| 6,772,026 B2 | 8/2004 | Bradbury et al. | |
| 7,045,738 B1 | 5/2006 | Kovacevic et al. | |
| 7,168,935 B1 | 1/2007 | Taminger et al. | |
| 7,777,155 B2 | 8/2010 | Twelves, Jr. et al. | |
| 8,342,229 B1 | 1/2013 | Ziani et al. | |
| 8,794,263 B2 | 8/2014 | Scott et al. | |
| 8,983,957 B2 | 3/2015 | Rathod | |
| 2001/0030383 A1 | 10/2001 | Swanson et al. | |
| 2003/0230393 A1 | 12/2003 | Kimura et al. | |
| 2003/0235635 A1 | 12/2003 | Fong et al. | |
| 2004/0003738 A1 | 1/2004 | Imiolek et al. | |
| 2004/0035542 A1 | 2/2004 | Ederer et al. | |
| 2004/0145629 A1 | 7/2004 | Silverbrook | |
| 2005/0023710 A1 | 2/2005 | Brodkin et al. | |
| 2005/0133653 A1 | 6/2005 | Heaney et al. | |
| 2005/0194401 A1 | 9/2005 | Khoshnevis | |
| 2005/0271414 A1 | 12/2005 | Katayama et al. | |
| 2006/0156978 A1 | 7/2006 | Lipson et al. | |
| 2007/0267165 A1 | 11/2007 | Monteiro et al. | |
| 2008/0136066 A1 | 6/2008 | Taylor et al. | |
| 2008/0150192 A1 | 6/2008 | Perret et al. | |
| 2009/0011066 A1 | 1/2009 | Davidson et al. | |
| 2009/0050289 A1 | 2/2009 | Lismont | |
| 2009/0076643 A1 | 3/2009 | Silverbrook | |
| 2009/0177309 A1 | 7/2009 | Kozlak | |
| 2009/0208577 A1 | 8/2009 | Xu et al. | |
| 2009/0252925 A1 | 10/2009 | Provoost et al. | |
| 2009/0267269 A1 | 10/2009 | Lim et al. | |
| 2011/0030557 A1 | 2/2011 | Brownstein et al. | |
| 2012/0113473 A1 | 5/2012 | Pettis | |
| 2013/0209600 A1 | 8/2013 | Tow | |
| 2014/0020192 A1 | 1/2014 | Jones et al. | |
| 2014/0050921 A1 | 2/2014 | Lyons et al. | |
| 2014/0085620 A1 | 3/2014 | Lobovsky et al. | |
| 2014/0252668 A1 | 9/2014 | Austin et al. | |
| 2014/0268604 A1 | 9/2014 | Wicker et al. | |
| 2014/0277659 A1 | 9/2014 | Kumar et al. | |
| 2014/0316546 A1 | 10/2014 | Walsh et al. | |
| 2015/0096713 A1 | 4/2015 | Marcin | |
| 2015/0104802 A1 | 4/2015 | Reep et al. | |
| 2015/0108687 A1 | 4/2015 | Snyder et al. | |
| 2015/0165693 A1 | 6/2015 | Sagoo et al. | |
| 2015/0209978 A1 | 7/2015 | Snyder et al. | |
| 2016/0001364 A1 | 1/2016 | Mironets et al. | |
| 2016/0067919 A1 * | 3/2016 | Hoyt .................. | B29C 67/0055 264/308 |
| 2016/0082652 A1 | 3/2016 | Snyder et al. | |
| 2016/0167254 A1 | 6/2016 | Cushing et al. | |
| 2016/0184893 A1 | 6/2016 | Dave et al. | |
| 2016/0207262 A1 | 7/2016 | Trowbridge | |
| 2016/0214175 A1 | 7/2016 | Nordstrom | |
| 2016/0243759 A1 | 8/2016 | Snyder et al. | |
| 2017/0038342 A1 | 2/2017 | Clavette et al. | |

FOREIGN PATENT DOCUMENTS

| | | |
|---|---|---|
| GB | 2399049 | 1/2006 |
| JP | 2009013395 | 1/2009 |
| WO | 2014070007 | 5/2014 |
| WO | 2014/144098 | 9/2014 |
| WO | 2015066607 | 5/2015 |

OTHER PUBLICATIONS

Dunn et al., "3D Printing in Space: Enabling New Markets and Accelerating the Growth of Orbital Infrastructure," Space Studies Institute, Oct. 29-31, 2010.

O'Connell, Frank, "A Machine that Gives Shape to Your Ideas," https://archive.nytimes.com/www.nytimes.com/interactive/2011/06/15/technology/personaltech/20110915-BASICS.html?_r=0, Sep. 14, 2011.

LeftAngle, "Injection Printing—Injection Molding on Your 3D Printer," Thingiverse, https://www.thingiverse.com/thing:82666, May 1, 2013.

LeftAngle, "Extreme High Definition Parts on Your 3D Printer," https://www.thingiverse.com/thing:83805, May 4, 2013.

Gaerisl, "Fume Chamber (Negative-Pressure, Activated Carbon Filtering),"https://www.thingiverse.com/thing:13851, Nov. 23, 2011.

International Search Report, dated Jun. 19, 2018.

* cited by examiner

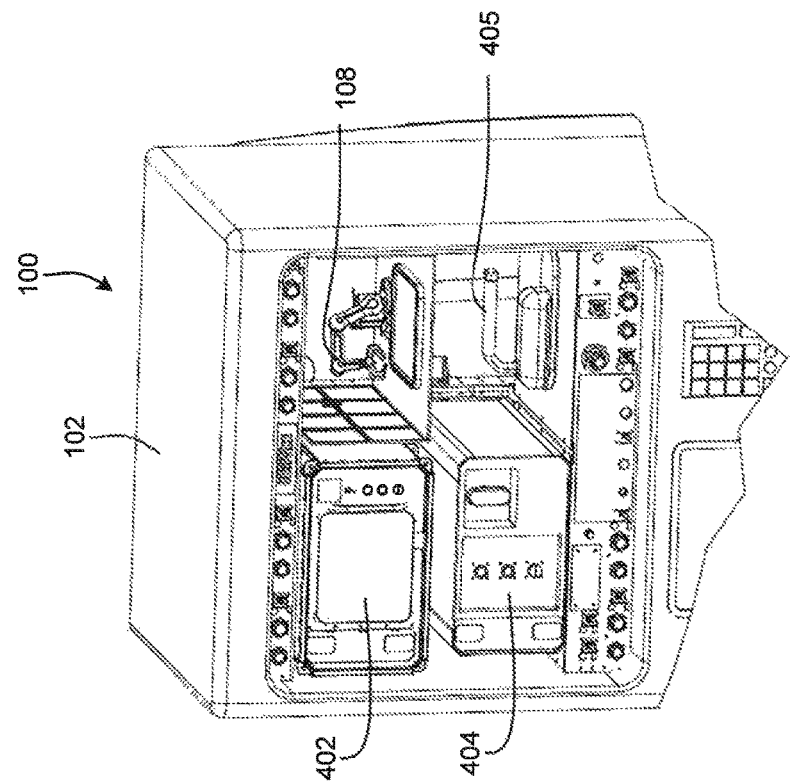
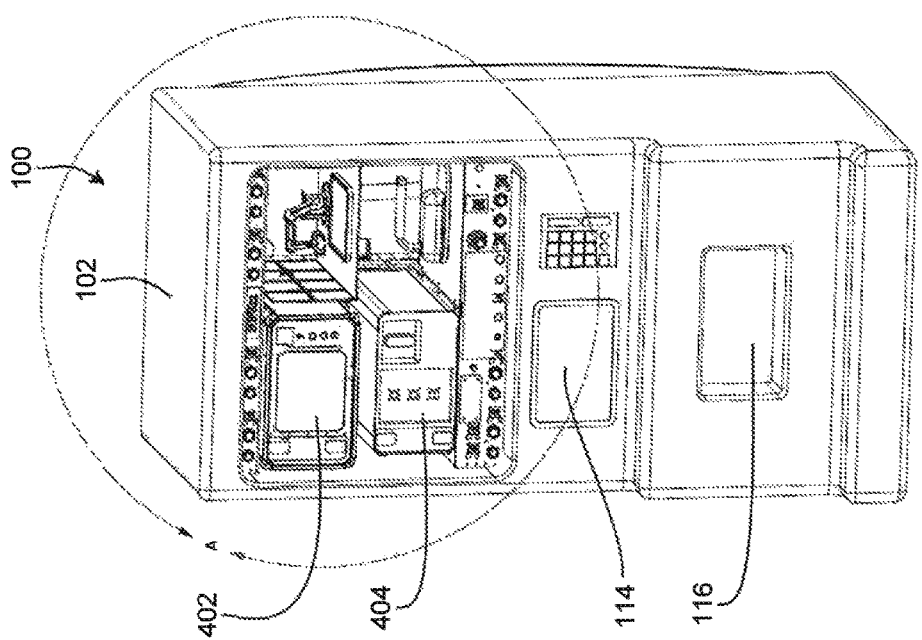
FIG. 4A
FIG. 4B

TERRESTRIAL AND SPACE-BASED MANUFACTURING SYSTEMS

CROSS REFERENCE TO RELATED APPLICATIONS

This application is a Continuation of International Application No. PCT/US2015/051219 with an international filing date of Sep. 21, 2015, which claims the benefit of U.S. Provisional Application No. 62/053,210 filed Sep. 21, 2014, the entire contents of which are incorporated herein by reference.

This application is also a continuation of U.S. Non-Provisional application Ser. No. 14/860,029 on Sep. 21, 2015, which claims the benefit of U.S. Provisional Application No. 62/053,210 filed Sep. 21, 2014, the entire contents of which are incorporated herein by reference.

The present application also incorporates the subject matter of the following patent applications in their entireties by reference: U.S. application Ser. No. 14/331,729 filed Jul. 15, 2014, which claims the benefit of U.S. Provisional Application No. 61/893,286 filed Oct. 21, 2013; U.S. Provisional Application No. 61/908,750 filed Nov. 26, 2013; and U.S. Provisional Application No. 61/931,568 filed Jan. 25, 2014.

The present application is also related to U.S. application Ser. No. 14/860,085 filed Sep. 21, 2015, which claims the benefit of U.S. Provisional Application No. 62/053,220 filed Sep. 21, 2014; and U.S. application Ser. No. 14/860,170 filed Sep. 21, 2015, which claims the benefit of U.S. Provisional Application No. 62/053,215 filed Sep. 21, 2014, the subject matter of both being incorporated herein by reference in their entireties.

The present application is also related to U.S. Provisional Application No. 62/162,626 filed May 15, 2015, and incorporated herein by reference in its entirety.

FIELD OF THE DISCLOSURE

The present disclosure generally relates to manufacturing and, more particularly, to systems and methods for creating objects from via modular assemblies containing multiple manufacturing devices.

BACKGROUND

Manufacturing of goods has traditionally been a multi-location, time intensive process. Typically, raw materials are transformed into components and sub components. These components are then transported to one or more additional facilities where they are turned into assemblies and finally into finished products. The finished product is packaged and shipped to a reseller, such as a retailer. In some instances, the finished product is shipped directly to the end user. Due to the length of the supply chain, goods are, by and large, produced in large volumes with little or no customization. Further, in order to reduce transportation costs and maximize sales volumes, goods are typically shipped to populated areas or other commercial centers.

Remote operations and space operations are impacted by the manufacturing supply chain because availability of a wide variety of goods is drastically reduced and supply of new goods is limited or nonexistent. In many cases, due to high cost, it is impractical to build new manufacturing facilities in remote locations or in space.

Additive manufacturing and similar customizable, computer-controlled manufacturing devices enable rapid on-site production of a part from a raw material, such as a polymer filament feedstock.

Given the foregoing, systems and methods are needed which facilitate on-site or near-to-site production of goods which might otherwise be produced by traditional manufacturing supply chains and facilities. Such goods may be produced by combinations of raw materials (e.g., feedstock) and stocks of sub-components located within the manufacturing system.

Additionally, systems and methods which produce multi-component, multi-material goods in space are needed.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Embodiments relate to a system and method for creating an object from via a modular assembly containing multiple manufacturing processes. The system comprises an additive manufacturing device to perform at least one additive manufacturing process and to include a prefabricated component during the at least one additive manufacturing process to accelerate build completion of a produced object.

The method comprises performing at least one additive manufacturing process with a manufacturing system to create at least a portion of a produced object. The method also comprises placing a prefabricated component as a second portion of the produced object with a manipulator. The method further comprises removing the produced object from a build surface with the manipulator.

Another system comprises a manufacturing system for producing an object where the manufacturing system comprises an additive manufacturing device to perform at least one additive manufacturing process creating at least a portion of the object, and a manipulator to place a prefabricated component as a second portion of the object and further configured to remove the object from a build surface

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements. Understanding that these drawings depict only typical embodiments and are not therefore to be considered to be limiting of its scope, the embodiments will be described and explained with additional specificity and detail through the use of the accompanying drawings in which:

FIGS. 4A and 4B are views of an embodiment of a manufacturing system including an additive manufacturing system;

DETAILED DESCRIPTION

Figure 1:
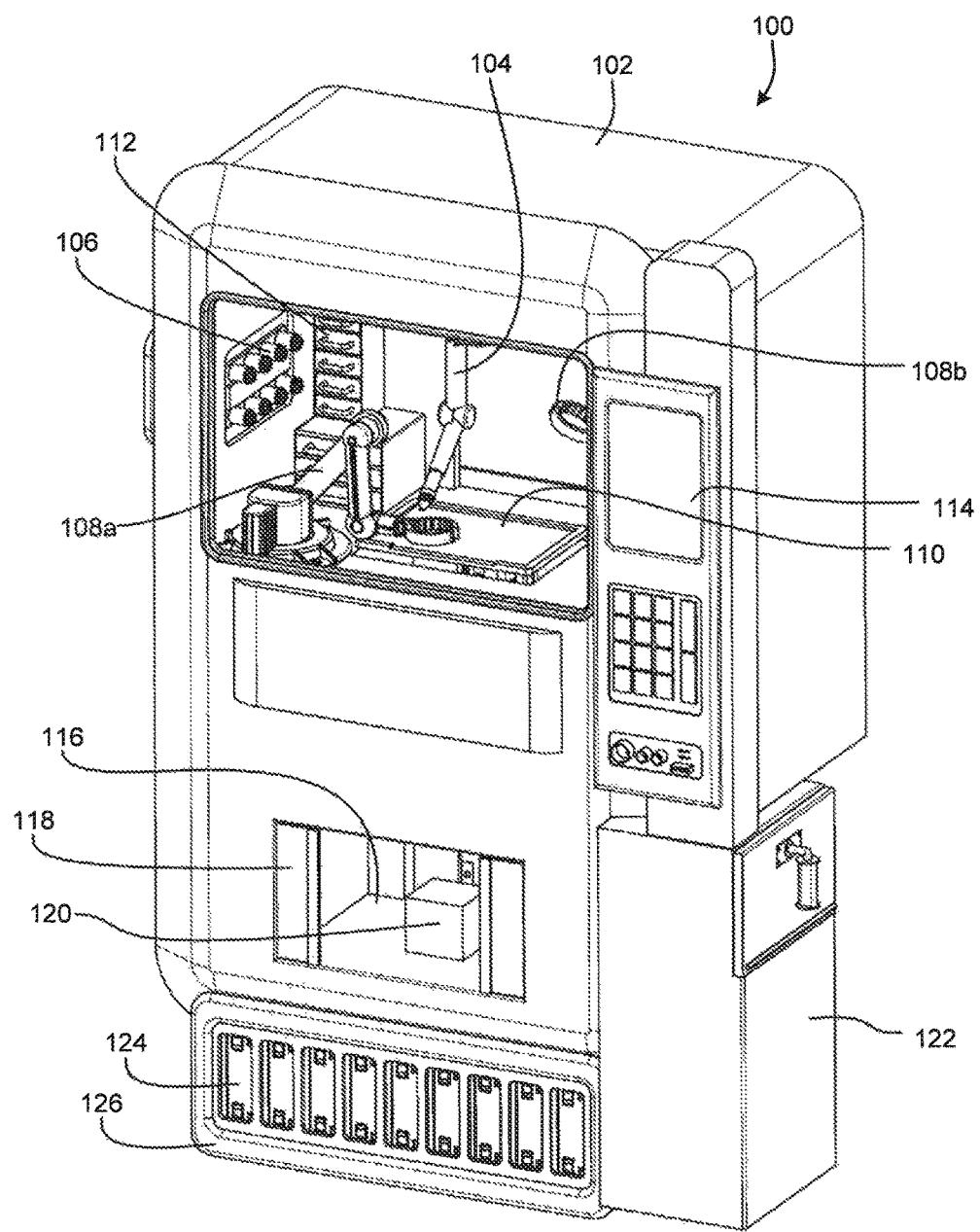
FIG. 1 is a perspective view of an embodiment of a self-contained goods manufacturing system including an additive manufacturing system.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognizes that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Embodiments are directed to a self-contained manufacturing system and related methods which facilitate on-site or near-to-site goods production. Produced goods may be and desired good apparent to those skilled in the relevant art(s) after reading the description herein. Goods may be of one or multiple materials, contain electrical components created by the manufacturing system or procured from a stock therein or supplied by a user. Manufacturing systems in accordance with the present disclosure may be utilized in remote areas, urban environments, in space, in close proximity to humans and other locations.

Manufacturing systems in accordance with an embodiment disclosed herein may include multiple manufacturing systems and at least one interchange mechanism which may enable the good to be created from multiple materials via the multiple manufacturing systems. In an embodiment, the interchange mechanism is a robotic arm which removes a created portion from one manufacturing system (e.g., a polymer-based additive manufacturing device) and positions it within a second manufacturing system (e.g., a finishing device, a metal-based additive manufacturing device, etc.) for addition of material from the second manufacturing system. In another embodiment, the interchange mechanism is a conveyor device (e.g., a conveyor belt). In yet another embodiment, the manufacturing system includes one or more robotic arms which selectively engage material bonding components (e.g., extruder heads) in order to add the desired material to the good being created. The robotic arm may have such material bonding components integrated into its structure (e.g., a rotating drum or extruders), removable attached to one or more material bonding components stored within the manufacturing system or the like.

Manufacturing systems may also include one or more devices which separate created parts or portions of parts from associated build tables, thereby enabling assembly of the good and easy removal by a user.

When manufacturing systems, in accordance with an embodiment disclosed herein, are deployed in space (e.g., on a space station, at a base on another celestial body) they enable a significant reduction of wasted logistical mass, as well as a reduction in the volume of trash storage. Similarly, when deployed in, as a non-limiting example, a retail environment, supply chains may be shortened, resulting in less energy, money and time used in moving goods around.

The manufacturing systems described herein take a traditional machine shop capability and puts it into a small footprint. The manufacturing systems may include any or all of traditional and additive manufacturing and assembly systems to be placed. This enables a wide range of components to be produced on demand, and on location. This device may be capable of replacing warehouses of materials and use raw form of feedstock to produce the same parts.

Embodiments disclosed herein provide a manufacturing system that is at least partially automated via techniques apparent to those skilled in the relevant art(s) after reading the description herein. Humans may be involved in some portions of a good production process (e.g., moving a part from one portion of the system to another).

The manufacturing system may be self-contained or distributed in another fashion. Generally, if a component is needed, one facility is capable of producing a multi-material component which may have embedded parts as well as simple, pre-supplied one-material parts. That is, in certain embodiments, the manufacturing system may include a stock, or bulk volume, of one material in a specific configuration such as, but not limited to, cubes, plates, or the like, which may be placed within the good as it is being built in order to more quickly produce the good, rather than having a manufacturing component build up that portion via other methods (e.g., additively manufacturing a bulk volume).

The manufacturing system may take the form of a vending type machine. In an embodiment, the manufacturing system includes scanning components, enabling it to produce duplicate or modified versions, identify damaged portions, repair those portions, and/or add to the originally supplied object.

The size of the manufacturing system may be varied in order to accommodate the desired application and integrate the necessary equipment. Assembly components, such as a robotic arm or a pick and place device may be used to embed components that are prefabricated. These prefabricated components can be of a wide variety including circuit boards, batteries, and common structural or electrical components that share functionality with many parts that would be produced. These components could also consist of wire used for embedding. As described above, the manufacturing system may include one or more scanning components. Such scanners may be used to inspect the good being created during creation and after it is completed. Where the good does not satisfy production requirements it may be discarded or transported to an integrated recycler. The integrated recycler may break the device down and produce filament or other feedstock which may be re-used by the manufacturing system.

In an embodiment, the manufacturing system may be configured to install as a series of components or as a modular unit in the express rack interface utilized on the International Space Station. The system may be installed in the rack and operated remotely or directly. Thus, the manufacturing system described herein may be integrated into a platform for terrestrial use or be placed outside of any platform and/or work together, but situated, independently.

The manufacturing system may include remote operation systems, tele-robotics components, robotic arms, and other type of manipulation equipment. The robotics may take components from subsystem to another if necessary and/or maneuver the part inside of the subsystem or system.

The manufacturing system, as disclosed herein, may be an all-in-one system or can consist of segmented subsystems. The entire facility may be upgradable and components may be swapped in and out for maintenance or upgrading capabilities. In some instances, robotic elements can switch end effectors to perform the correct manufacturing or assembly process. Both traditional and additive manufacturing methods can be used and could have additional components such as plating, polishing, coating, heat treating, sintering, annealing, etc. The arm can also do other necessary functions such as scanning, inspecting, and repairing. The system may use robotic arms or other elements in order to assemble a part or manipulate it during the manufacturing process.

The manufacturing system may create more than one good or type of good at the same time. As a non-limiting example, where the manufacturing system includes multiple build areas within different construction devices (e.g., a metal additive manufacturing device and a polymer additive manufacturing device), different goods may be simultaneously created within each device. Where the goods or the portions being created are smaller than the build surface or area, multiple goods may be simultaneously created beside one another. Similarly, several of the same type of production devices can also be used in this fashion or to build a single part in a compressed amount of time.

The manufacturing system, as disclosed herein, may include an enclosed build and assembly areas. The enclosed area may be filtered, temperature- and humidity-controlled and/or monitored in order to protect people and equipment near the system and ensure that goods are created in ideal environmental conditions. Principles and devices disclosed in U.S. application Ser. No. 14/331,729 filed Jul. 15, 2014, may be utilized in controlling the environment of manufacturing systems disclosed herein.

Air filtration and cleaning may be utilized to ensure safe operations for both terrestrial and non-terrestrial versions. Such systems and/or environmental control units may clean the harmful off-gassing constituents from the atmosphere.

The manufacturing system may be controlled by on-board and/or cloud-based software including commanding, operating the subsystems (e.g., individual manufacturing devices), manipulating models for manufacture and repair and the like. Software developed will enable the seamless change out of system types inside the rack and define workflow "pipelines." These pipelines will allow hardware to be interchanged without having to update the system's software. That is, individual components and sub-systems will have defined inputs and output protocols, avoiding the need to reprogram the manufacturing system itself when components are upgraded, added or removed. In this manner, the system will also be upgradeable without requiring upgrades to such components.

In an embodiment, the software controlling the manufacturing system is a "common software interface" with configurable reusable modular pipelines which define top level manufacturing processes so that when upgrading the hardware, reworking the hardware is not necessary. Such an architecture may include scriptable modules, require that any physical device that is plugged in works with the module that is made for that type of device (all printers must work with the top level printer operation module), define blocks of operations that are operations to the hardware that is inside, enabling scriptability and swapability, and the like.

In an embodiment, the manufacturing system includes a queuing and resource balancing and scheduling system that is aware of the current resource usage of each component as well as of the overall system inside and of the predicted future utilization so it can create multiple goods or portions of goods for one or more customers in order to optimize completion time and utilization of the overall device. Remote monitoring of all aspects of the system can be performed on a network level. In an embodiment, a centralized dashboard is provided and accessible from computing devices via, for example, the global public Internet, can monitor and get status updates, as well as determine what is being printed and shut off the rack if needed.

In an embodiment, computation for various activities may be handled via network or cloud computing. More generally, other computing devices (on-site or remote) may be communicatively connected to the manufacturing system in order to facilitate its operation. Similarly, goods designs may be imported, cloud processing may be used to analyze scans, scans and other data may be sent for analysis and modification to individuals in other locations.

Figure 2:
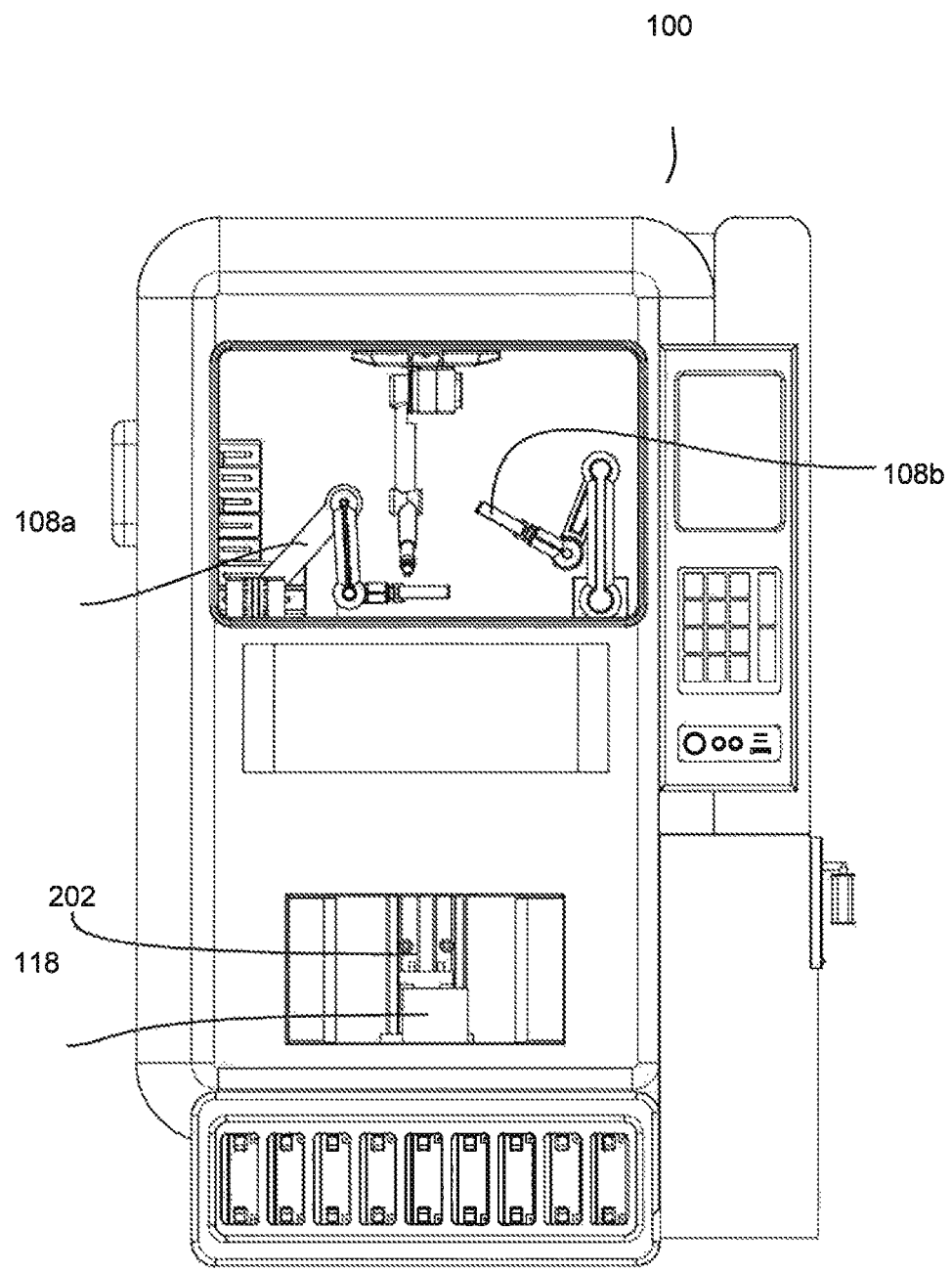
FIG. 2 is a front view of an embodiment of the manufacturing system depicted in FIG. 1.
Figure 3:
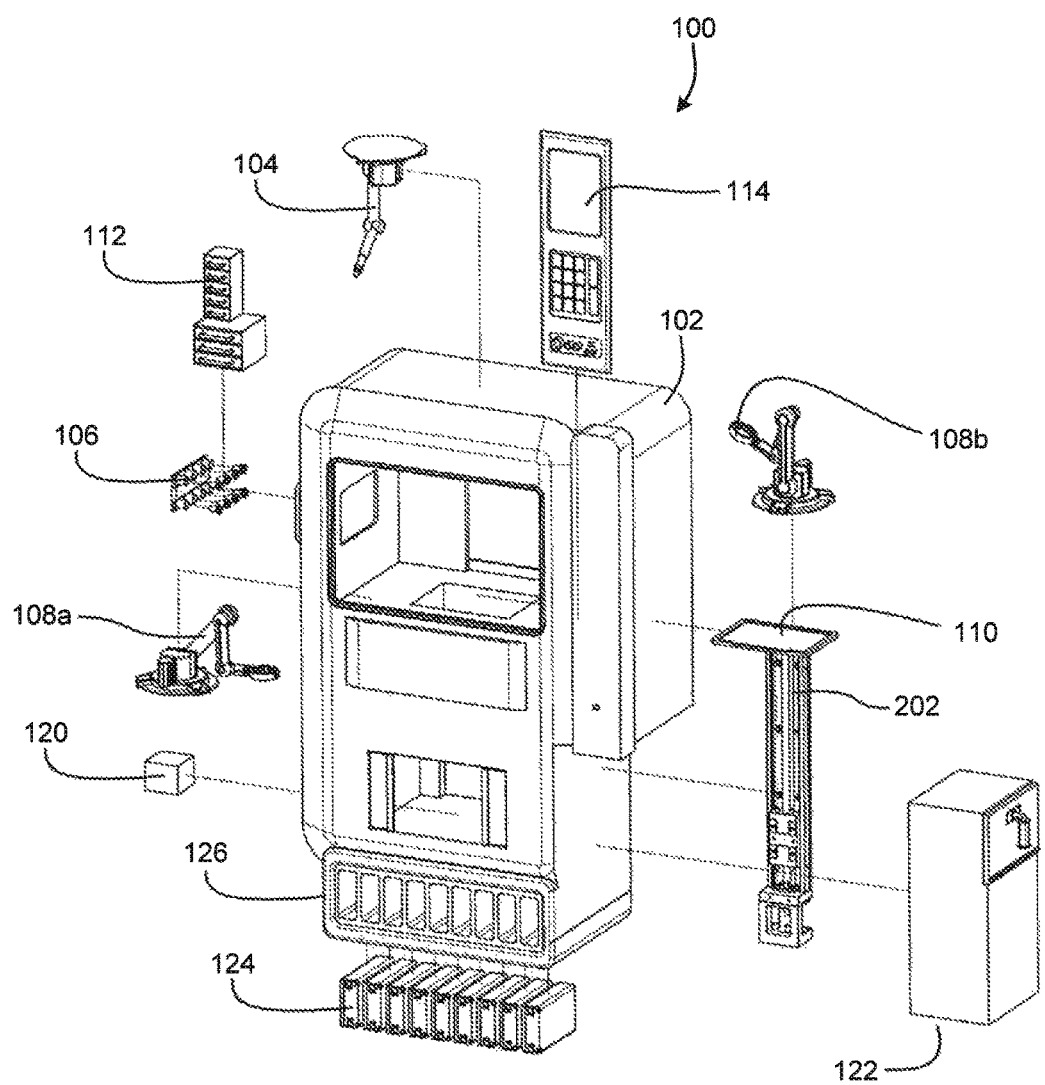
FIG. 3 is an exploded view of an embodiment of the manufacturing system depicted in FIG. 1.

Now referring to FIGS. 1-3, various views of a self-contained goods manufacturing system 100 including at least one additive manufacturing system 104 are shown. More specifically, FIG. 1 is a perspective view of an embodiment of self-contained goods manufacturing system including an additive manufacturing system, FIG. 2 is a front view of an embodiment of the manufacturing system depicted in FIG. 1, and FIG. 3 is an exploded view of an embodiment of the manufacturing system depicted in FIG. 1.

The manufacturing system 100 includes a housing 102. The housing 102 may be an enclosure which contains other portions of system 100, allowing the internal environmental control unit and other systems to regulate the internal environment, purify the environment and/or protect users and equipment from dangers associated with nominal and off-nominal operations.

The system 100 may be operable via a user interface 114. The user interface 114 may include a display, physical inputs, voice command functionality and the like.

Goods, or products, may be created via one or more manufacturing devices 104. In an embodiment, the manufacturing device 104 is an articulating arm having feedstock supplied to it and removable end effectors 105. The end effectors 105 may be accessed at an end effector storage area 106 positioned within system 100. Feedstock is supplied from one or more feedstock cartridges 124, thereby enabling the supply of a variety of different types of material and configurations of material (e.g., different colors, thicknesses). Multiple feedstock cartridges 124 may be contained within a feedstock housing 126.

A good, or product, may be produced on movable build tray 110. The tray may be movably connected to a vertical lift 202. The lift 202 may move the tray 110 from the build area to a finished good area 116. The finished good area 116 may be accessible by a user via, as a non-limiting example, sliding doors 118. In this manner, the user may receive completed good 120 without interacting with the manufacturing portions of system 100. The pre-fabricated part storage 112 may include, but is not limited to, computing components, prefabricated components, fasteners, and the like which may be added to the good being created via manipulators 108 (shown as manipulators 108a and b in FIG. 1).

Where a good is produced which does not conform with the users requirement, the creation fails, or the like, system 100 may include a recycler 122 which breaks all or portions of the rejected good down and converts it back to feedstock for system 124. The recycler 122 may also be used for old parts as a way to recycle them for use in developing replacement parts. Thus, in an embodiment, individuals may provide polymer-based objects (e.g., a soda bottle) to system 100 which may then be recycled into feedstock via recycler 122. The recycler 122 is described in greater detail with respect to FIG. 10.

The system 100 may include any appropriate manufacturing or finishing device suitable for the desired application. The system 100 may include pick and places, robotic mechanisms, and the like.

The system 100 may use a variety of materials to produce objects, including multi-material objects and/or objects having electronic components. These materials include thermopolymers, metals, electronics, modular components and the like. The material may be resupplied by replacing or refilling pre-fabricated part storage 112 or feedstock cartridges 124.

Now referring to FIGS. 4A and 4B, views of manufacturing system 100 are shown. The system 100 may include multiple manufacturing devices 104 operating in multiple build areas. For example, a first manufacturing device 104 may be a polymer-based additive manufacturing device 402. A second manufacturing device 104 may be a metal casting unit 404. An arm 108 may be a pick and place mechanism for adding electronic components to the good being created. A scanner 405 may be included to inspect the good during creation and after completion to ensure quality. Though multiple manufacturing devices 104 are shown, in an embodiment, a single additive manufacturing device may be provided which can perform a plurality of additive manufacturing processes.

Supplemental robotic assemblies or other device (not shown) may be utilized to move a good from one area of the system 100 to another as it is being created. In an embodiment, the system 100 is configured to produce a plurality of goods of the same type. In this manner, the system 100 may serve as a small-footprint manufacturing plant.

Figure 5:
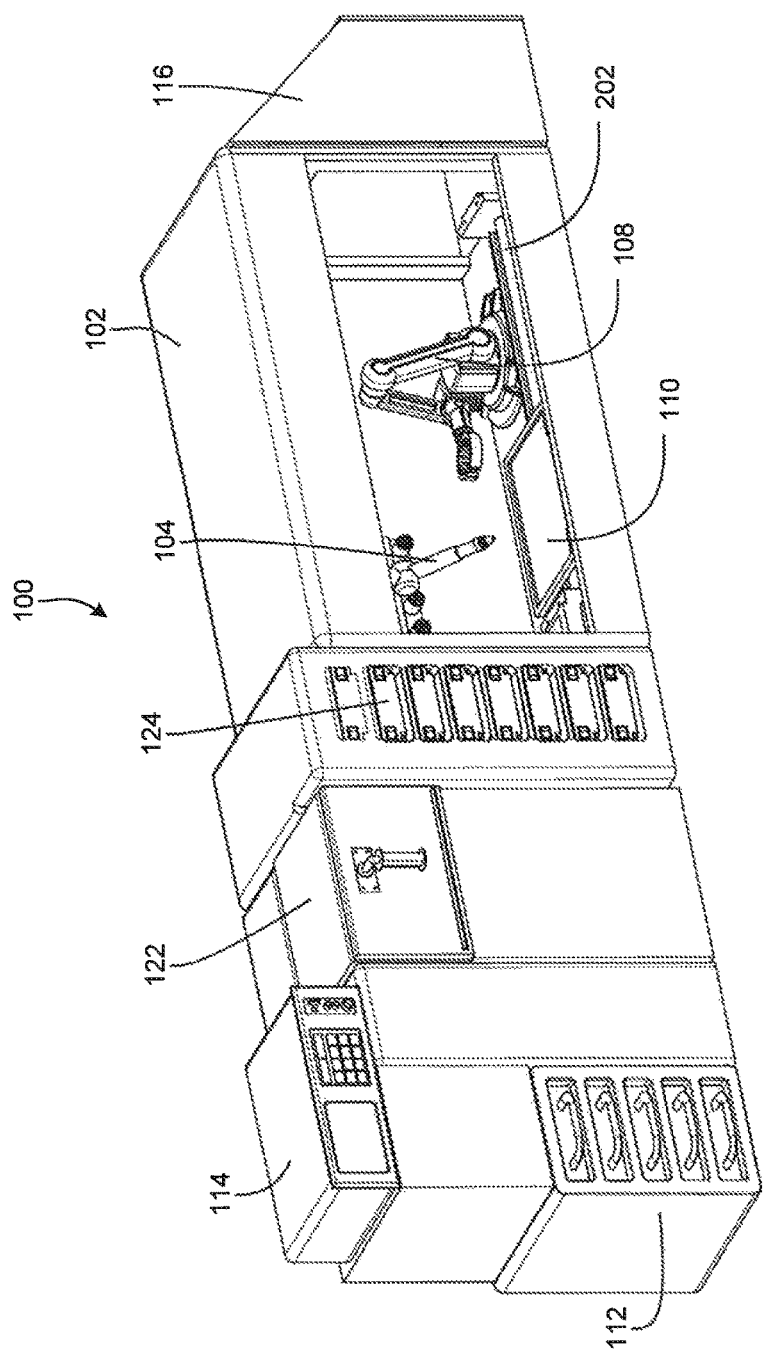
FIG. 5 is a perspective view of an embodiment of a self-contained goods manufacturing system including multiple additive manufacturing systems, the good transported on a lateral conveyor device within the manufacturing system.
Figure 6:
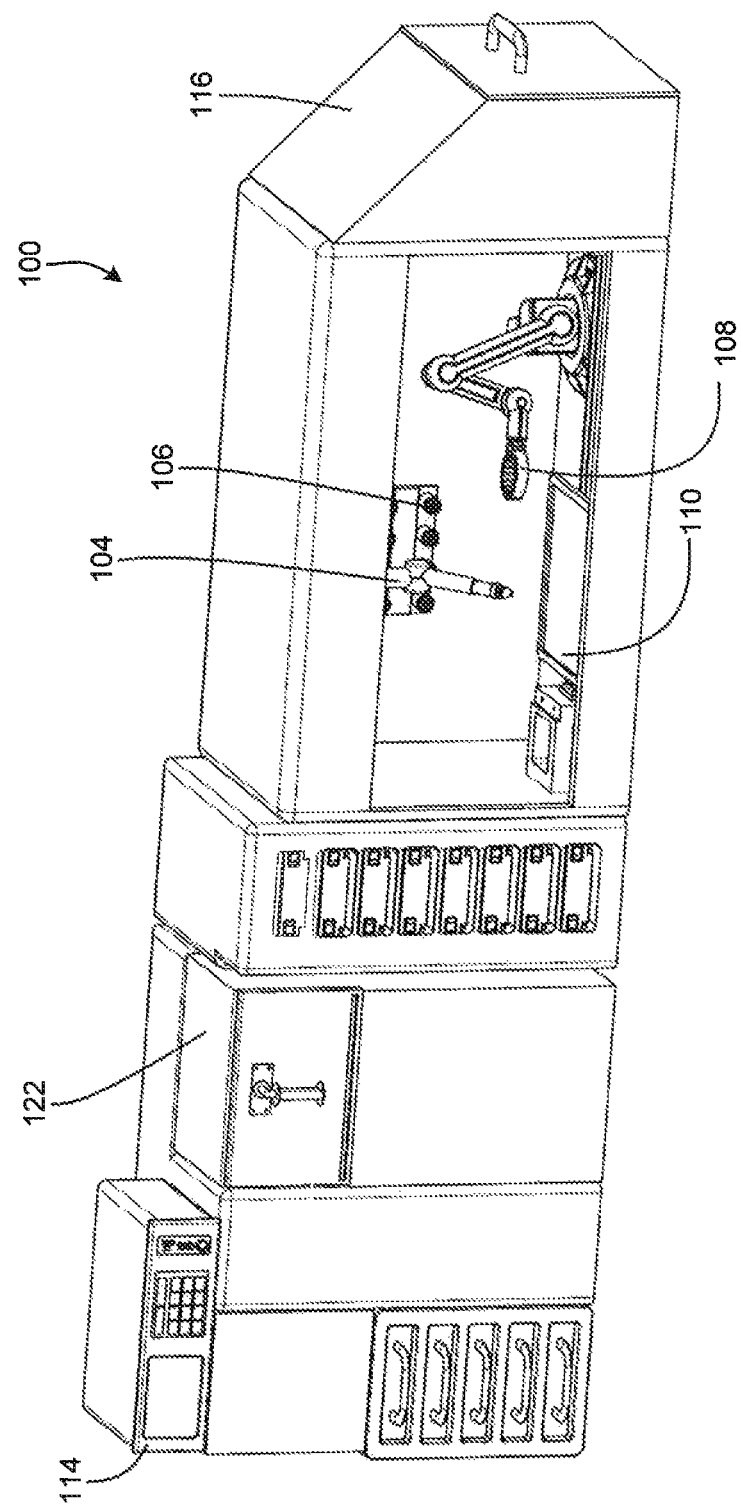
FIG. 6 is a top perspective view of an embodiment of the manufacturing system of FIG. 5.
Figure 7:
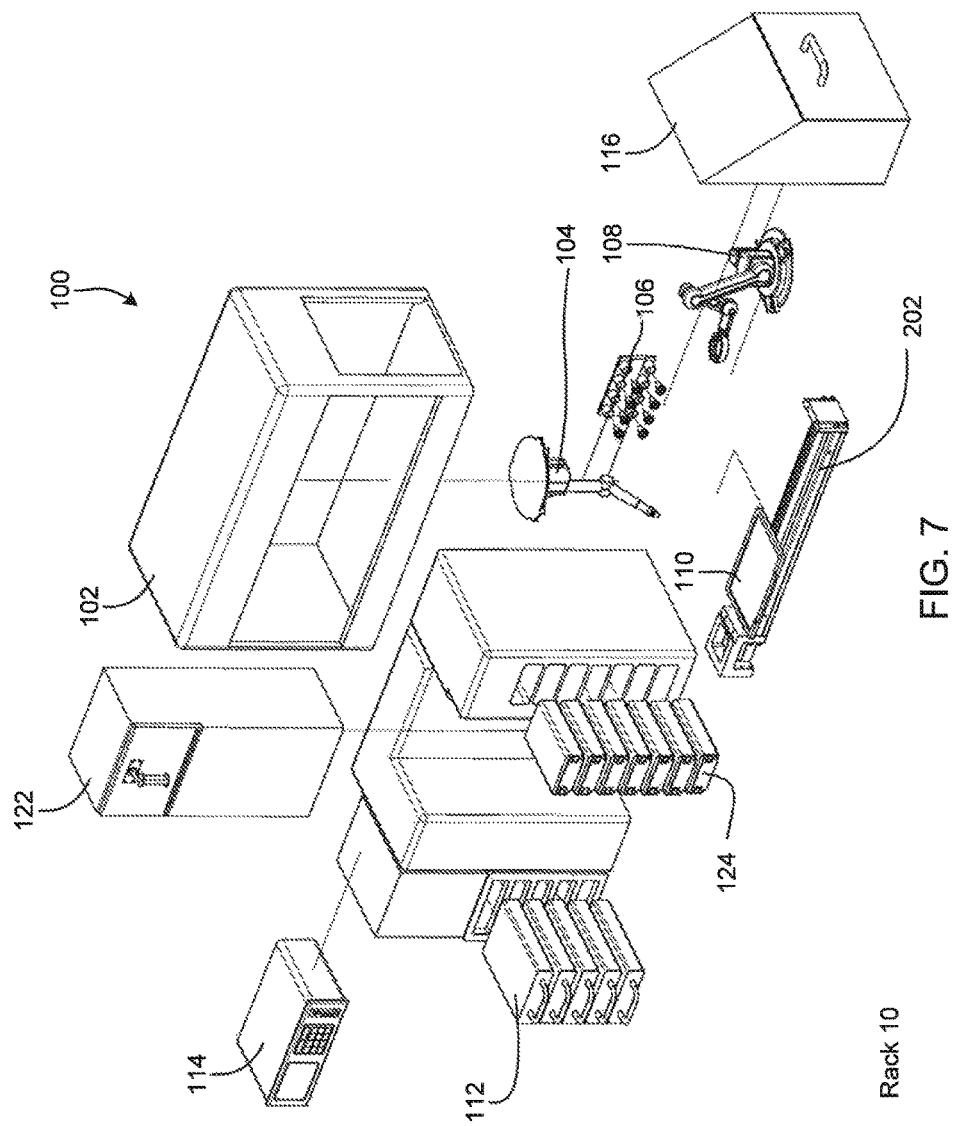
FIG. 7 is an exploded view of an embodiment of the manufacturing system depicted in FIG. 5.

Referring now to FIGS. 5-7, various views of self-contained goods manufacturing system 100 including multiple additive manufacturing systems 104, the good transported on a lateral conveyor device 202 within manufacturing system 100 is shown. More specifically, FIG. 5 is a perspective view of an embodiment of a self-contained goods manufacturing system including multiple additive manufacturing systems, the good transported on a lateral conveyor device within the manufacturing system, FIG. 6 is a top perspective view of an embodiment of the manufacturing system of FIG. 5, and FIG. 7 is an exploded view of an embodiment of the manufacturing system depicted in FIG. 5. The system 100 may have a variety of configurations, including the horizontal configuration depicted in FIGS. 5-7 as compared to the vertical configuration depicted in FIGS. 1-3. The system 100 may include a lateral conveyor 202 which transports good between one or more manufacturing devices 104 and to finished good area 116 which complete. Thus, a configuration of the system is non-limiting.

Figure 8:
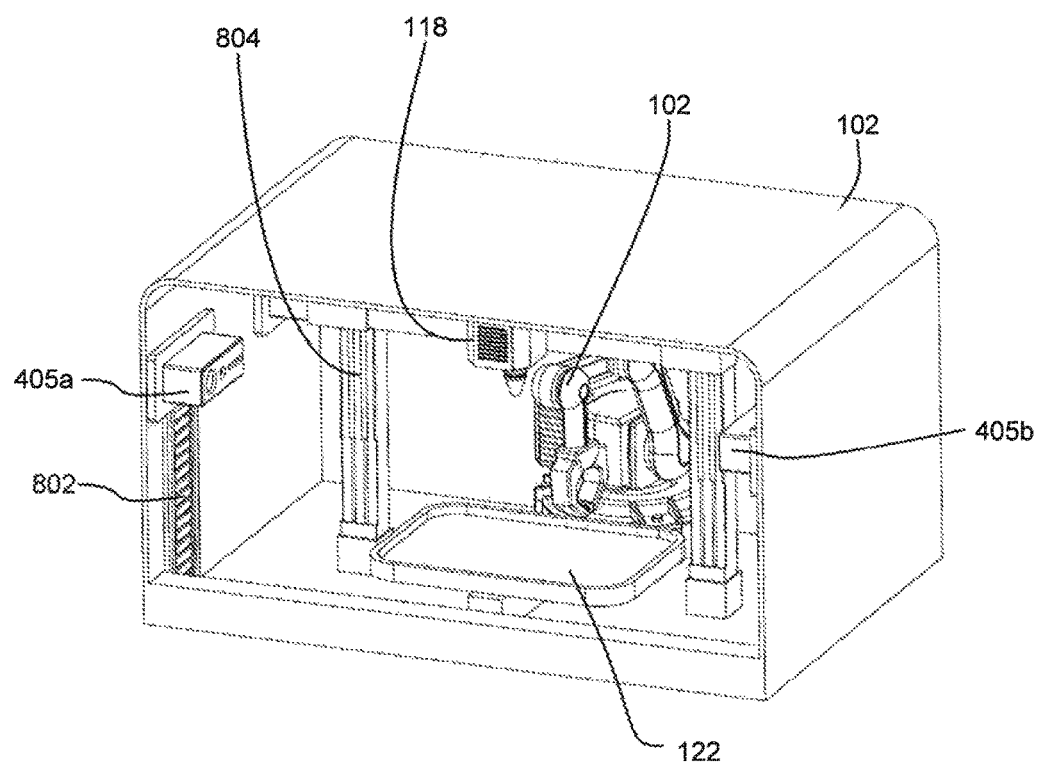
FIG. 8 is a perspective view of an embodiment of a tabletop self-contained goods manufacturing system including an additive manufacturing system.

Referring now to FIG. 8, a perspective view of a tabletop self-contained goods manufacturing system 100 including additive manufacturing system 104 is shown. In an embodiment, the system 100 may comprise a tabletop device configured to produce, as a non-limiting example, handheld goods. The system 100 may include an extruder 118 positioned by a traverse system 804. The goods, or products, being produced may be monitored via a pair of scanners 405a and 405b mounted on vertical tracks 802. As suggested by the pair of scanners 405a, 405b in FIG. 8, high measures of security may be implemented to protect any costly material and components inside the system 100.

In an embodiment, portions of the system 100 which may be prone to increased wear and components that require replenishment may be modular in nature to ensure fast and uncomplicated maintenance procedures. The system 100 may be designed to be extremely rugged and/or able to withstand all aspects associated with an environment in which the system 100 is intended to operate. As a non-limiting example, the system 100, when intended for use in space, the system may be extremely rugged to withstand spaceflight (launch, landing, installations). Whereas in other embodiments, the system 100 may be rugged to withstand natural elements (wind, rain, snow, etc.).

Figure 9:
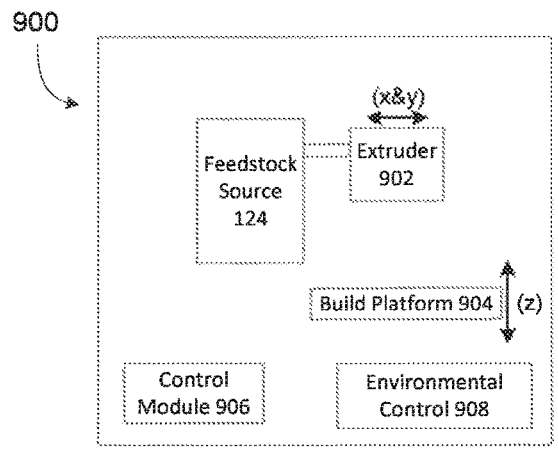
FIG. 9 is a block diagram of an embodiment of an additive manufacturing device.

Referring now to FIG. 9, a block diagram of an exemplary additive manufacturing device 900 is shown. In an embodiment, an additive manufacturing device 900 is configured to produce goods or portions of goods using filament supplied by feedstock cartridge 124. The additive manufacturing device 900 may be configured to utilize polymer filament, metal filament, filament made from a, mixture of materials, and the like. The additive manufacturing device 900 comprises a filament extruder 902 positionable in two axes (e.g., x and y axes). The additive manufacturing device 900 may be a fused deposition-type device or any other additive manufacturing device apparent to those skilled in the relevant art after reading the description herein, including, but not limited to, a stereolithographic device, an electron beam freeform fabrication device, and a selective laser sintering device. The additive manufacturing device 900 further comprises a build platform 904 positionable in a third axis (e.g., the z-axis). The build platform 904 is configured to support goods as they are being constructed.

The build platform 904 may be a build tray 110. In an embodiment, the build platform 904 may be omitted. The build platform 904 may be a support which holds another part, thereby enabling additive manufacturing device 900 to add additional portions (i.e., layers) to the part being held. Actuators, though not shown, may be attached to the filament extruder 902 and the build platform 904. In an embodiment, the additive manufacturing device 900 comprises one actuator for each axis.

The filament extruder 902 may be adapted to create a desired good or portion of good on build platform 904 via deposition of a polymer or other material. Deposition may be done in an additive manner, such as a layer-wise or raster pattern. The positions of the filament extruder 902 and the build platform 904 during construction may be controlled by a build control module 906, electrically connected to each actuator. The build control module 906 may be software, hardware, or a combination of software and hardware. The build control module 906 may be configured to cause the desired part (e.g., a support structure) to be produced by additive manufacturing device 900.

The filament extruder 902 is connected to a feedstock source 124. The environmental control 910 may be configured to regulate the environment of additive manufacturing device 900 and/or the surrounding system 100.

In an embodiment, the environmental control 910 may comprise at least one fan, a temperature regulation device (e.g., a heater, an air conditioning unit), and a filter. The environmental control 910 may regulate one or more of: temperature, humidity, and air quality within additive manufacturing device 900, thereby preventing outgassing and contamination of the environment in which additive manufacturing device 900 is located during operation.

Figure 10:
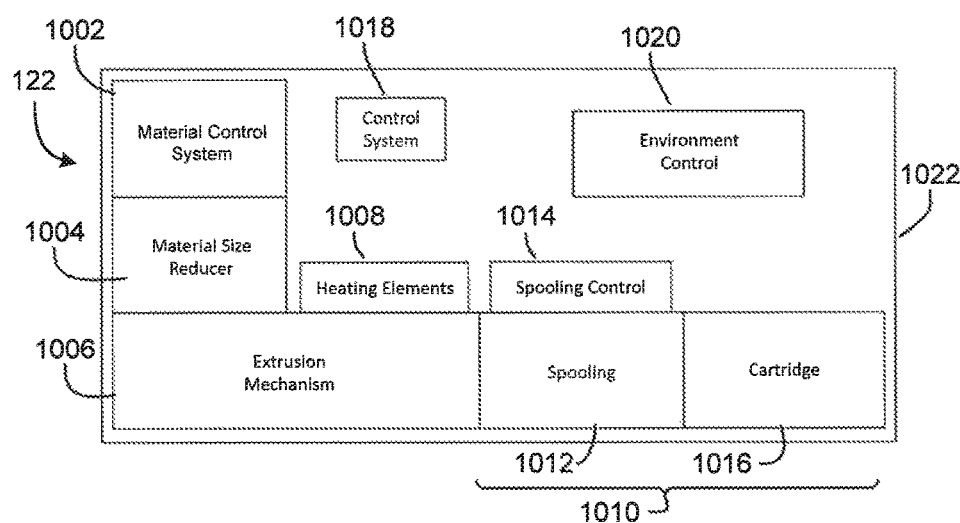
FIG. 10 is a block diagram of an embodiment of a recycler device.

Referring now to FIG. 10, a block diagram of recycler 122 is shown. The recycler 122 may be based on the recycler disclosed in U.S. Provisional Application No. 62/162,626 filed May 15, 2015, and incorporated herein by reference. The recycler 122 is configured to accept materials such as trash, broken or obsolete parts, in-situ materials, and the like and convert the materials to a feedstock such as a filament. The recycler device 122 comprises a material control system 1002, a material size reducer 1004, an extruder 1006, and a spooling assembly 1010. The recycler device 122 may further comprise heating elements 1008, control system 1018, and environmental control 1020. Some or all of the portions of recycler device 122 may be contained within housing 1022.

The material control system 1002 drives material towards desired locations in the recycler device 122. The material control system 1002 may comprise direct or indirect airflow systems (e.g., fans, air compressors) pressure fed systems, or physical contacting devices in order to drive material through recycler device 100.

The size reducer 1004 may be provided to reduce a size of materials inserted into recycler device 122 from their original size to a shape and size suitable for use in extruder 1006. The size reducer 1004 may shred, grind, cut, and/or pulverize material into portions small enough for utilization by extruder 1006.

The extruder 1006 receives material from size reducer 1004, further manipulates the size and shape of the material, heats the material via one or more attached heating elements 1008 and pushes the pliable or molten material through a die. The material may be moved through the extruder 1006 via an auger, a piston, another mechanism apparent to those skilled in the relevant art(s) or a combination thereof.

The heating element 1008 may heat the barrel portion of extruder 106, causing the material within to reach a deformable state. The heating elements 1008 may be controlled by control system 1018 which monitors the temperature of the material within extruder 1008 and maintains the temperature at a desired level.

The spooling assembly 1010 may be configured to receive filament, or feedstock, as it exits the extruder 1006 at die and spool filament onto a spool suitable for utilization by the additive manufacturing device 900. The spooling assembly 1010 may comprise a spooling mechanism 1012, such as a rotating wheel configured to receive and spool filament. One or more portions of spooling assembly may be controlled by spooling control 1014. The spooling control 114 may be controlled by control system 1018.

The environmental control 1020 may be configured to regulate the environment of recycler device 122. The recycler device 122 may also comprise a housing 1022 which contains each element of recycler device 122, enabling control of the environment of recycler device 122 by environmental control 1020.

Figure 11:
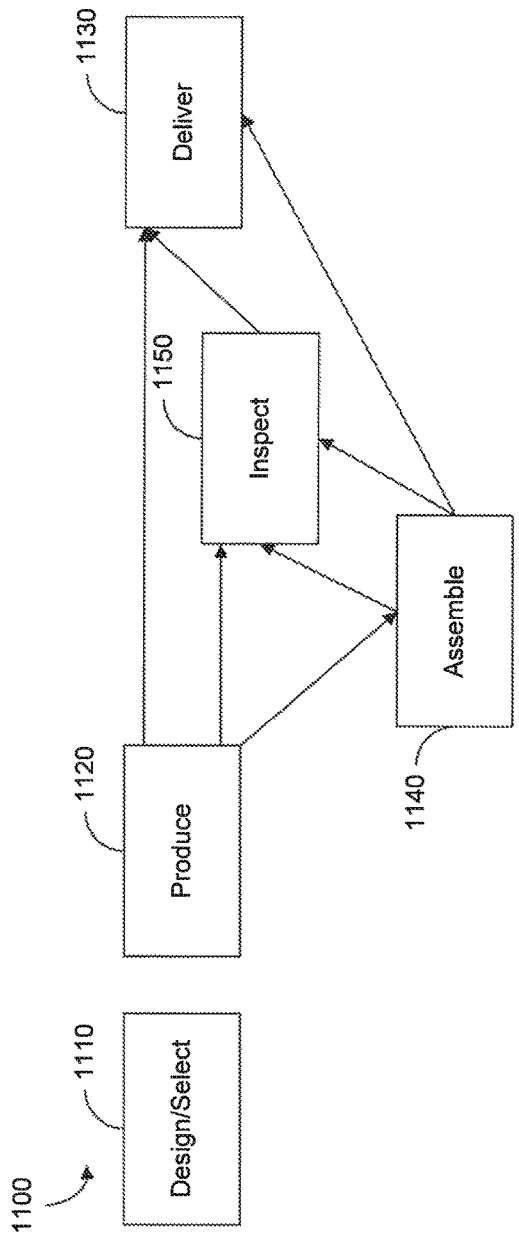
FIG. 11 is a flowchart depicting an embodiment of a process for creating and delivering a user-designated good.

Referring now to FIG. 11, a flowchart depicting an embodiment of a process 1100 for creating and delivering a user-designated good is shown. As shown, the process, or method, 1100 may comprise a design/select step, at 1110. The design/select step, at 1110, provides for determining a product to make with at least one of a plurality of additive manufacturing processes located within an enclosure to control an environmental condition within the additive manufacturing process area. Determining the product may comprise scanning a prior product with a scanning device to ascertain the product to make or selecting the product to make with a user interface that has access to a database of a plurality of products.

A produce step, at 1120 is shown. The produce step, at 1120, provides for producing the product with at least one of the plurality of additive manufacturing processes. A deliver step, at 1130 is shown. The delivery step, at 1130, provides the product to a user outside of the enclosure where the environmental condition is controlled for the at least one of the plurality of additive manufacturing processes. This is further accomplished by transporting the product with a conveying system, to an area outside of the enclosure where the environmental condition is controlled for the at least one of the plurality of additive manufacturing processes. An assembly step, at 1140, is provided. The assembly step may be provided when the product is made of more than one material. The assembly step may include transporting the product to multiple locations within the system 100 during manufacture and prior to delivery, at step 1130. An inspect step, at 1150, is also provided to provide for inspecting the product prior to delivery, at 1130. As disclosed above, the inspect step, at 1150, may be accomplished with a scanner to ensure that the product meets a quality standard for the product.

The process 1100 may utilize the system 100 disclosed herein to produce a desired good. The system 100 may be designed to focus on retail items, making them available digital, and function as a vending type machine. A digital object may be selected and a physical item will be constructed. In another embodiment, the digital object is designed from an existing object. Items that may be produced include hardware items such as, but not limited to, nails, screws, piping, fixtures, as well as tools such as hammers, screw drivers, wrenches, pliers, etc. Also, it is able to produce consumer products and items with electrical components. The system 100 may be of a size that can fit into a variety of locations including commercial stores, homes, and integrated into vehicles such as cars, trucks, boats, aircraft, spacecraft, etc. The user interface 114 may be designed to accommodate both adults and children's understanding on how system 100 functions.

Figure 12:
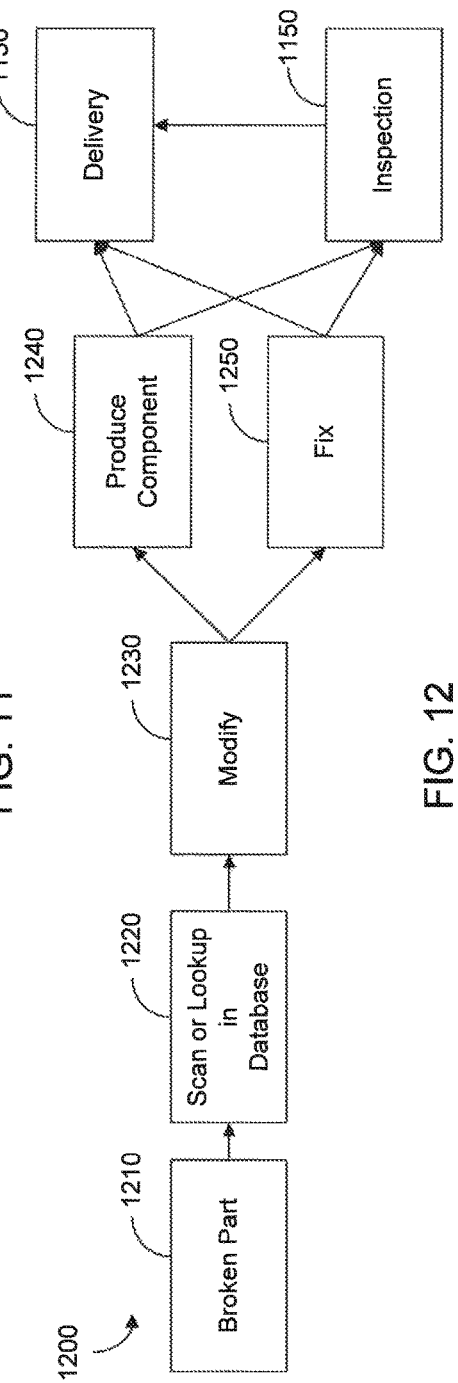
FIG. 12 is a flowchart depicting an embodiment of a process for repairing or reproducing a user-supplied object.

Referring now to FIG. 12, a flowchart depicting an exemplary process 1200 for repairing or reproducing a user-supplied part is shown. The process 1200 may utilize the system 100 to fix, repair and/or reproduce a desired good.

An object, at 1210, may be placed into a portion of system 100 in order for it to be scanned, at 1220. The object may be a broken component. The scan may be used to either create a replacement part or to fix the scanned component. In another embodiment, a mobile communications device may be used to scan and/or order a component. In another embodiment, the inspect step, at 1150, may detect an error with a recently constructed component.

A modify step, at 1230, is provided where the system can correct the scanned digital image. As a non-limiting example, if the scanned digital image is missing a section of the image, based on the image captured, the missing section may be extrapolated and created by the system 100. A similar approach may be utilized to fix a component, as disclosed below. This may also be used to fix a scanned component. In another embodiment, through the user interface, a user can simply look up a replacement component in a database, at 1220. The database may comprise a plurality of digital images of components, goods, products that can be made with the system 100.

In one embodiment, at a produce component step, at 1240, the system produces the component, good, or product. The component is inspected, at 1150 then delivered, at 1150, or simply delivered, at 1130.

If the system 100 is being used to fix a broken component, the system 100 applies an appropriate additive manufacturing process to fix the component, at 1250. The component is inspected, at 1150 then delivered, at 1150, or simply delivered, at 1130.

Thus, as disclosed above, quality control will be also an aspect of the system 100. Both the process 1100 and the process 1200 may include an inspection step, at 1150. Determined based upon the process, an inspection system will verify the quality of the produced good and either accept or reject it. Rejected pieces may be sent to the recycler 122 for repurposing. One method of quality control for duplication of components involves overlaying the scan of the good that is to be duplicated with the final good or good throughout the manufacturing process. The overlay will show the variation or difference from the desired good and can be fed through the user's defined tolerance preference. This could function as follows: put object on tray; scan it; remove part; print part in same spot; scan as printing to maintain accuracy; scan final part with overlay of original scan; compare final scan and scan of initial part; generate accuracy number; job done if accuracy is sufficiently high; rejected if not accuracy is sufficient.

In an embodiment, the system 100 may accept payment in any electronic medium as well as direct cash supply.

Figure 13:
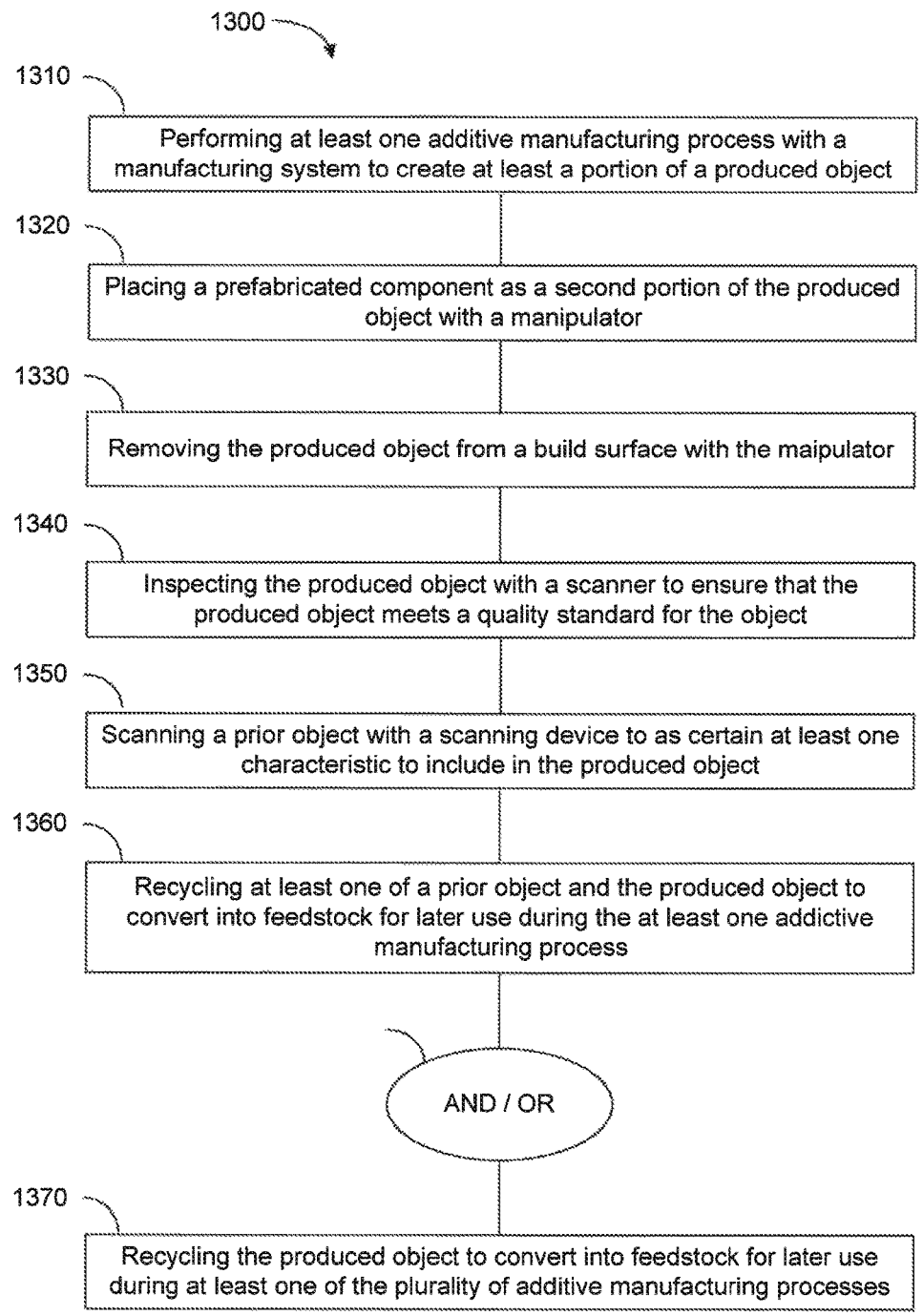
FIG. 13 is a flowchart depicting an embodiment of a method for repairing or reproducing a user-supplied object.

FIG. 13 is a flowchart depicting an embodiment of a method for repairing or reproducing a user-supplied object. The method 1300 comprises performing at least one additive manufacturing process with a manufacturing system to create at least a portion of a produced object, at 1310. The method 1300 further comprises placing a prefabricated component as a second portion of the produced object with a manipulator, at 1320. The method 1300 further comprises removing the produced object from a build surface with the manipulator, at 1330.

The method 1300 may further comprise inspecting the produced object with a scanner to ensure that the produced object meets a quality standard for the object, at 1340. The method 1300 may further comprise scanning a prior object with a scanning device to ascertain at least one characteristic to include in the produced object, at 1350. The method may further comprise recycling at least one of a prior object and the produced object to convert into feedstock for later use during the at least one additive manufacturing process, at 1360 and/or recycling the produced object to convert into feedstock for later use during at least one of the plurality of additive manufacturing processes, at 1370.

Though the steps in the method are illustrated in sequence, the sequence may be performed in other orders whereas this sequence is simply provided to explain steps that may be utilized, with no requirement to following the precise sequence illustrated. Furthermore, each of dependent steps, 1340-1370 may be performed in combination with or without the other independent steps. Showing these steps in sequence is done simply to provide for a possible, non-limiting visualization.

Figure 14:
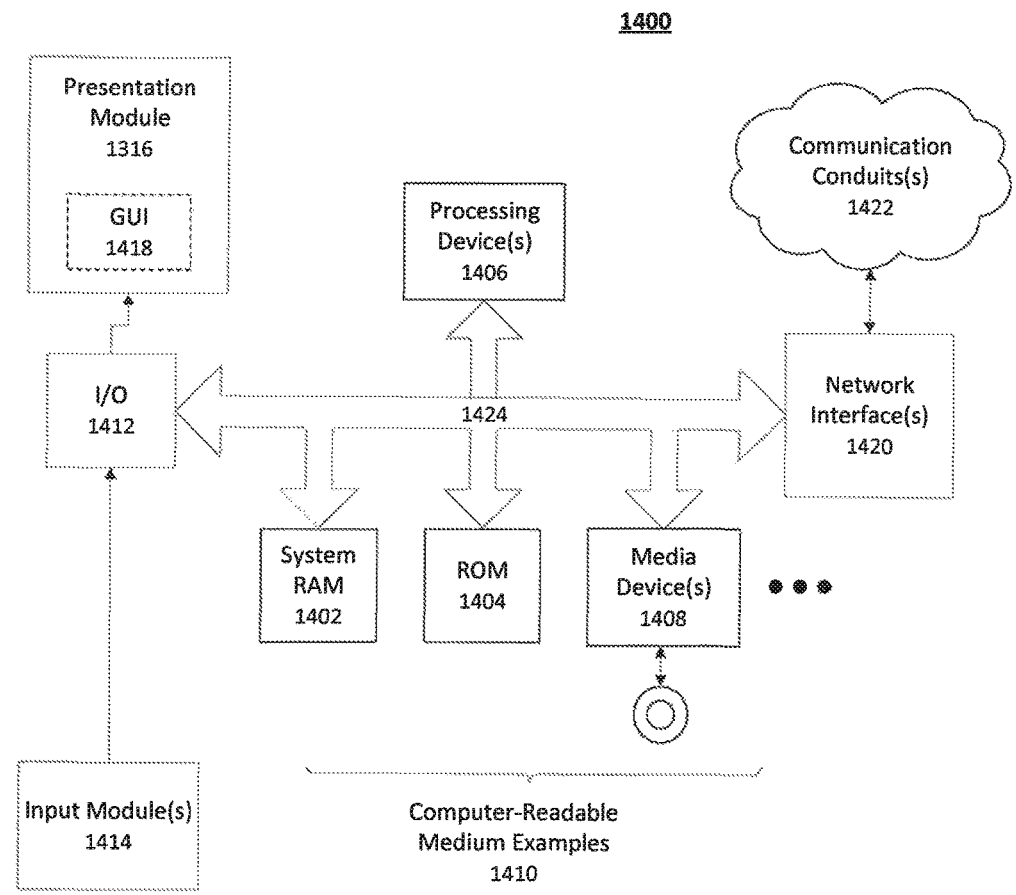
FIG. 14 is a block diagram illustrating an embodiment of a computer system useful for implementing an embodiment disclosed herein.
Figure 14:

Referring to FIG. 14, a block diagram illustrating an exemplary computer system useful for implementing an embodiment is shown. FIG. 14 sets forth an illustrative computer system that may be used to implement computing functionality 1400, which in all cases represents one or more physical and tangible processing mechanisms. Computing functionality 1300 may comprise volatile and non-volatile memory, such as RAM 1402 and ROM 1404, as well as one or more processing devices 1406 (e.g., one or more central processing units (CPUs), one or more graphical processing units (GPUs), and the like). Computing functionality 1400 also optionally comprises various media devices 1408, such as a hard disk module, an optical disk module, and so forth. Computing functionality 1400 may perform various operations identified above when the processing device(s) 1406 execute(s) instructions that are maintained by memory (e.g., RAM 1402, ROM 1404, and the like).

More generally, instructions and other information may be stored on any computer readable medium 1410, including, but not limited to, static memory storage devices, magnetic storage devices, and optical storage devices. The term "computer readable medium" also encompasses plural storage devices. In all cases, computer readable medium 1410 represents some form of physical and tangible entity. By way of example, and not limitation, computer readable medium 1410 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 1402, ROM 1404, EEPROM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

Computing functionality 1400 may also comprise an input/output module 1412 for receiving various inputs (via input modules 1414), and for providing various outputs (via one or more output modules). One particular output module mechanism may be a presentation module 1316 and an associated GUI 1418. Computing functionality 1400 may also include one or more network interfaces 1420 for exchanging data with other devices via one or more communication conduits 1422. In some embodiments, one or more communication buses 1424 communicatively couple the above-described components together.

Communication conduit(s) 1422 may be implemented in any manner (e.g., by a local area network, a wide area network (e.g., the Internet), and the like, or any combination thereof). Communication conduit(s) 1422 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Thus, the embodiment disclosed above meet the above-identified needs by providing systems, and related methods which produce finished parts at an on-site or near-to-site location. Such systems contain multiple additive manufacturing devices, feedstock, and other sub-components, thereby enabling the production of a wide range of physical goods.

In an embodiment, a manufacturing system may be enclosed and may contain additive manufacturing devices which produce goods from metal, polymers, other materials, and/or combinations thereof. A user may select the desired good from an integrated user interface (e.g., touchscreen, keyboard, voice command, etc.). Upon selection, the self-contained manufacturing system begins producing the desired good according to creation instructions. Portions of the good may be produced by multiple manufacturing devices. The system may contain one or more movement mechanisms (e.g., robotic grappling arms, conveyor belts) which move the good being created from one additive manufacturing device to another as needed in order to create the part. In another embodiment, the good being created may remain stationary and multiple additive manufacturing devices are iteratively moved into a position where the device may construct the necessary portion of the good the device is suitable for. This may be accomplished by having a single articulating arm with multiple feedstock delivery mechanisms (e.g., a feedstock channel) connected thereto or positioned therein which engages for use multiple extrusion heads.

Once the part is created, it may be deposited into a finished good area, accessible by the user. In an embodiment, the finished good area and the UI are the only user-accessible portions of the manufacturing system, thereby making the device safe for use around users, particularly unskilled users or consumers.

The manufacturing system may be adapted for use in microgravity, on celestial bodies (e.g., the Moon, asteroids, other planets), in space, in remote locations, in locations where unskilled individuals will interact with the system, and other locations that will be apparent to those skilled in the relevant art(s) after reading the description herein.

The manufacturing system may produce a wide variety of goods, components, or products. The goods may be produced simultaneously for multiple users. The manufacturing system may be low-profile relative to traditional manufacturing facilities. The manufacturing system may be enclosed and approximately the size of vending machine. The manufacturing system may be smaller (e.g., table top-sized) or larger (e.g., the size of a room or small house). In this manner, manufacturing devices may be deployed in a variety of areas including remote areas, retail stores, urban areas, and the like, thereby essentially placing an entire warehouse or manufacturing supply chain in one device which produces the goods on demand. Such devices are automated, producing goods as the need arises.

This overcomes the logistics of manufacturing. With respect to space applications, on-site production of more complex goods is facilitated in a safe and streamlined manner. Manufacturing systems in accordance with the present disclosure may be deployed at lower cost and in locations which could not previously be considered.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices. The features of the present disclosure described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, and the like).

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A system comprising:
    an additive manufacturing device configured to perform at least one additive manufacturing process utilizing at least one of layer by layer deposition and raster pattern deposition of material and to include a bulk volume component during the at least one additive manufacturing process instead of an additive manufactured component made during the at least one additive manufacturing process to accelerate build completion of a produced object; and
    at least one of a robotic arm and a conveyor device configured to enable the produced object to be created from multiple materials via more than the at least one additive manufacturing process by at least one of manipulation of the produced object with the robotic arm, placement of the bulk volume component with the robotic arm, and transport of at least one of the produced object and the bulk volume component;
    a plurality of end effectors interchangeably attachable to an end of the robotic arm wherein at least a first end effector of the plurality of end effectors comprises a gripper device to at least place the bulk volume component and a second end effector of the plurality of end effectors comprises a filament extruder deposit the material for least one of the layer by layer deposition and the raster pattern deposition; and
    an end effector storage area, to hold the plurality of end effectors, configured to be accessible by the robotic arm to retrieve at least one of the plurality of end effectors;
    wherein the bulk volume component is at least one of a bulk volume of at least one of a same material being applied during the at least one additive manufacturing process, a different material, and a bulk volume with an embedded part that comprises at least one of a circuit board, battery, a wire, and an electrical component that shares functionality with at least a portion of the produced object.

2. The system according to claim 1, wherein the at least one additive manufacturing process comprises at least one of a polymer-based additive manufacturing process and a metal casting additive manufacturing process.

3. The system according to claim 1, wherein the conveyor device transports the produced object from a build area where the at least one additive manufacturing process occurs to a retrieval area where the product is retrieved.

4. The system according to claim 1, wherein the conveyor device transports the produced object during production from a first build area for the at least one additive manufacturing process to a second build area for a second additive manufacturing process.

5. The system according to claim 1, wherein the additive manufacturing device comprises a plurality of additive manufacturing devices wherein each additive manufacturing device performs a particular additive manufacturing process.

6. The system according to claim 1, further comprising a recycler to convert the produced object into feedstock for use with the at least one additive manufacturing process.

7. The system according to claim 1, further comprising a housing wherein the additive manufacturing device further comprises a housing within which the additive manufacturing device and at least one of a robotic arm and a conveyor device are located.

8. The system according to claim 1, further comprising at least one feedstock cartridge, each feedstock cartridge comprising a different type of at least material and configuration of material as feedstock.

9. The system according to claim 1, further comprising at least one storage area to hold the bulk volume component prior to placement of the bulk volume component during the at least one additive manufacturing process.

10. The system according to claim 1, further comprising a build area where the at least one additive manufacturing process occurs and an environmental control unit regulates an environment at the build area.

11. The system according to claim 7, further comprising a user interface and a product receiving area, wherein the housing is arranged to separate a build area during the at least one additive manufacturing process from at least one of a user interface and a product receiving area.

12. The system according to claim 11, wherein the user interface receives an input to determine the produced object to be manufactured with the additive manufacturing device.

13. The system according to claim 1, wherein a third end effector of the plurality of end effectors is configured to provide for plating, a fourth end effector of the plurality of end effectors is configured to provide for polishing, a fifth end effector of the plurality of end effectors is configured to provide for coating, a sixth end effector of the plurality of end effectors is configured to provide for heat treating, a seventh end effector of the plurality of end effectors is configured to provide for sintering, and an eighth end effector of the plurality of end effectors is configured to provide for annealing.

14. A manufacturing system for producing an object, the manufacturing system comprising;
    an additive manufacturing device to perform at least one additive manufacturing process creating at least a portion of the object through a first end effector that comprises a filament extruder;

a second end effector that comprises a gripper device to attach to a bulk volume component to place the prefabricated bulk volume component as a second portion of the object and further configured to remove the object from a build surface; and an arm to which at least one of the first end effector and the second end effector attaches to provide for at least one of the at least one additive manufacturing process and attaching to the bulk volume, the arm is maneuverable about the object;

wherein the bulk volume component is at least one of a bulk volume of at least one of a same material being applied during the at least one additive manufacturing process, a different material, and a bulk volume with an embedded part that comprises at least one of a circuit board, battery, a wire, and an electrical component that shares functionality with at least a portion of the produced object.

15. The manufacturing system according to claim 14, further comprising a build surface.

16. The manufacturing system according to claim 14, further comprising at least one storage area to hold the bulk volume component prior to placement of the bulk volume component as the second portion of the object by the manipulator.

17. The manufacturing system according to claim 14, wherein the bulk volume component comprises a bulk volume of at least one of a same material being applied with the at least one additive manufacturing process and a different material to accelerate production of the produced object.

18. The manufacturing system according to claim 14, further comprising a recycler to convert the object into feedstock for use with the at least one additive manufacturing process.

19. The manufacturing system according to claim 14, further comprising an environmental control unit to regulate an environment at the build area.

20. The manufacturing system according to claim 14, wherein the additive manufacturing device further comprises:

an articulating arm;

a plurality of end effectors, each end effector of the plurality of end effectors autonomously attachable to the articulating arm to perform at least one of a manufacturing and assembly process; and at least one feedstock cartridge located as a part of a housing, each feedstock cartridge comprising a different type of at least material and configuration of material as feedstock;

wherein feedstock is provided through the articulating arm and the at least one end effector to create the produced object.

21. The manufacturing system according to claim 15, wherein the build area comprises a tray movable from the build area to a product receiving area when the additive manufacturing process is complete.

22. The manufacturing system according to claim 14, further comprising a user interface to receive an input to determine the object to be manufactured with the additive manufacturing device.

23. The manufacturing system according to claim 15, further comprising a housing to separate the build area during the at least one additive manufacturing processes from a user interface and a product receiving area.

* * * * *